United States Patent
Norton

(10) Patent No.: US 12,205,023 B2
(45) Date of Patent: Jan. 21, 2025

(54) SYSTEM AND METHOD FOR INSPECTING ITEMS

(71) Applicant: SMITHS DETECTION-WATFORD LIMITED, Hemel Hempstead (GB)

(72) Inventor: Timothy Norton, Hemel Hempstead (GB)

(73) Assignee: Smiths Detection-Watford Limited, Hemel Hempstead (GB)

( * ) Notice: Subject to any disclaimer, the term of this patent is extended or adjusted under 35 U.S.C. 154(b) by 1095 days.

(21) Appl. No.: 17/056,870

(22) PCT Filed: May 21, 2018

(86) PCT No.: PCT/GB2018/051370
§ 371 (c)(1),
(2) Date: Nov. 19, 2020

(87) PCT Pub. No.: WO2019/224506
PCT Pub. Date: Nov. 28, 2019

(65) Prior Publication Data
US 2021/0201137 A1 Jul. 1, 2021

(51) Int. Cl.
*G06N 3/08* (2023.01)
*G01V 5/22* (2024.01)
*G06Q 50/26* (2012.01)

(52) U.S. Cl.
CPC ............. *G06N 3/08* (2013.01); *G01V 5/22* (2024.01); *G06Q 50/26* (2013.01)

(58) Field of Classification Search
CPC ............ G01V 5/0016; G01V 5/0083; G01V 5/0008; G01V 5/232; G01V 5/271;
(Continued)

(56) References Cited

U.S. PATENT DOCUMENTS 7,071,823 B2 7/2006 Boesch et al.
7,212,113 B2 * 5/2007 Zanovitch ............ G08B 25/085
340/5.1
(Continued)

FOREIGN PATENT DOCUMENTS

CN 103917862 A 7/2014
WO 02082290 A1 10/2002
(Continued)

OTHER PUBLICATIONS

International Search Report and Written Opinion for application No. PCT/GB2018/051370, dated Oct. 1, 2018, 12 pgs.
(Continued)

*Primary Examiner* — Irakli Kiknadze
(74) *Attorney, Agent, or Firm* — Armstrong Teasdale LLP

(57) ABSTRACT

A system for inspecting items in transit through a transit facility, wherein the system comprises a plurality of data collection units located at a plurality of transit facilities; a decision entity, in connection with the data collection unit at a selected one of the transit facilities; and a server connectable to each of the data collection units. The server comprising a data store storing inspection data, obtained from the data collection units, indicative of instances of item inspection at the plurality of transit facilities; and a processor coupled to the data store and operable to update the data store based on data gathered at the data collection units. Wherein, for an item in transit through a transit facility, the system is configured to obtain item data providing an indication of a predicted level of inspection for the item and provide said item data to the decision entity; obtain, from the decision entity, a decided level of inspection for the item; and output a command signal to control inspection of the item in accordance with a final level of inspection assigned to the item, wherein the final level of inspection is selected based on an indication of: (i) the predicted level of inspec-
(Continued)

tion for the item, and (ii) the decided level of inspection for the item.

14 Claims, 5 Drawing Sheets

(58) Field of Classification Search
CPC ........ G01V 5/22; G06Q 10/083; G06Q 10/08; G06Q 50/26; G06Q 10/0833; G06Q 50/28; G06Q 10/0832; G06Q 10/06; G06Q 50/265; G06Q 10/0838; G06N 3/08; G06N 5/02; G06F 16/22; G06F 9/541; G06F 9/546; G08B 21/12; G08B 25/10; G08B 21/18; G08B 13/194; G06K 9/00771; G06K 9/6267; G06K 9/6211; G06K 9/4604; G06K 9/4671; G06K 9/66; G06K 9/4642; G06K 9/52; G06K 9/6215; G06K 9/6256; G06K 2009/4666; G06T 7/60; G06T 7/62; G06T 2207/10116; G06T 7/0004; G06T 7/001; G06T 2207/30248; G06T 15/08; G01N 23/04; G01N 2223/401; G01N 2223/639; G01N 23/10; G01N 23/043; G01F 22/00; G01F 17/00; G05B 2219/42222; G06V 20/52; G03B 27/462; G03B 27/735
USPC .............................................. 378/57, 58, 62
See application file for complete search history.

(56) References Cited

U.S. PATENT DOCUMENTS

| | | | |
|---|---|---|---|
| 7,983,387 B1* | 7/2011 | Toh | G01N 23/203 378/57 |
| 10,416,098 B2* | 9/2019 | Liesenfelt | G01V 5/22 |
| 2002/0176531 A1 | 11/2002 | McClelland et al. | |
| 2003/0085163 A1 | 5/2003 | Chan et al. | |
| 2003/0225612 A1 | 12/2003 | Desimone et al. | |
| 2004/0252024 A1 | 12/2004 | Huey et al. | |
| 2005/0248450 A1 | 11/2005 | Zanovitch | |
| 2008/0056444 A1 | 3/2008 | Skatter et al. | |
| 2011/0231158 A1 | 9/2011 | Carpenter et al. | |
| 2016/0189360 A1 | 6/2016 | Kang et al. | |
| 2017/0242148 A1 | 8/2017 | Yu et al. | |
| 2022/0229204 A1* | 7/2022 | Morton | G01V 5/232 |

FOREIGN PATENT DOCUMENTS

| | | |
|---|---|---|
| WO | 2013036735 A1 | 3/2013 |
| WO | 2018029361 A1 | 2/2018 |

OTHER PUBLICATIONS

China First Office Action, Application No. 201880095599.8, dated Oct. 28, 2023, 41 pps.: with English translation.
Wu Zhifang et al., "Image Acquisition, Transmission and Assignment in 60Co Container Inspection System", Nuclear Electronics & Detection Technology, vol. 19, No. 1, Jan. 20, 1999, 5 pages.

* cited by examiner

SYSTEM AND METHOD FOR INSPECTING ITEMS

CROSS-REFERENCE TO RELATED APPLICATIONS

This application claims priority to International Application No. PCT/GB2018/051370 filed on May 21, 2018, which is hereby incorporated by reference in its entirety.

TECHNICAL FIELD

The present disclosure relates to transit facilities. In particular, systems and methods disclosed herein relate to controlling inspection of items in transit through transit facilities.

BACKGROUND

Transit facilities such as customs authorities at ports and borders may have a vast through flow of items of cargo. It is desirable to identify potential substances of interest (e.g. contraband such as drugs or weapons) in an item passing through the transit facility. That way, such items of cargo can be stopped and any substances of interest removed.

Identifying the presence of a substance of interest in an item of cargo is not always straightforward. To this effect, different types of scans may be obtained for an item of cargo, or a physical inspection of the item of cargo may be performed. These actions may enable the identification of a substance of interest. However, such actions can also be very time-consuming. When dealing with a vast number of items of cargo (such as at a customs authority), there may be insufficient resources to cope. For example, there may not be enough man hours to perform a physical inspection of every item of cargo, or there may be a limited number of scanners causing a backlog in scanning. The cumulative effect of performing a detailed inspection of every item of cargo may introduce substantial delays to the time it takes for any given item to progress through the transit facility.

Another issue associated with transit facilities is that of false negatives occurring for scan data. For example, an x-ray scan of a container may appear to show no contraband being present, when actually it is. The two problems may be linked in that the only way to know for sure if there is contraband in a container is to physically inspect the entirety of the contents of that container. It may therefore be desirable to control the movement and inspection of items of cargo at a transit facility to address these issues.

SUMMARY

Aspects of the disclosure are set out in the independent claims and optional features are set out in the dependent claims. Aspects of the invention may be provided in conjunction with each other, and features of one aspect may be applied to other aspects.

In an aspect, there is provided a system for inspecting items in transit through a transit facility. The system comprises: a plurality of data collection units located at a plurality of transit facilities; a decision entity, in connection with the data collection unit at a selected one of the transit facilities; and a server connectable to each of the data collection units. The server comprises: a data store storing inspection data, obtained from the data collection units, indicative of instances of item inspection at the plurality of transit facilities; and a processor coupled to the data store and operable to update the data store based on data gathered at the data collection units. For an item in transit through a transit facility, the system is configured to: obtain item data providing an indication of a predicted level of inspection for the item and provide said item data to the decision entity; obtain, from the decision entity, a decided level of inspection for the item; and output a command signal to control inspection of the item in accordance with a final level of inspection assigned to the item. The final level of inspection is selected based on an indication of: (i) the predicted level of inspection for the item, and (ii) the decided level of inspection for the item.

Aspects of the disclosure may utilise a technical configuration of the transit control system to obtain data from which global averages for the system as a whole may be determined. Such sharing, collection and use of data from multiple transit collection facilities may enable global averages to be determined and used when controlling items in transit through any one individual transit facility. Override actions may be performed where a decided level of inspection (as decided by a decision entity) is overridden and instead a different (final) level of inspection is performed. Using such aggregated data analysis methods, as is made possible by the technical configuration of the transit control system, such override actions may be determined more reliably, as any decision to override may be determined based on more reliable and consistent data (e.g. the global average). Movement of an item through a transit facility may therefore be controlled based on these override actions. Embodiments of the disclosure may provide for improved systems and methods for checking the contents of an item in transit which may otherwise have passed through the transit facility without any further data being collected from that item. Thus, embodiments may provide for improved detection of substances of interest at transit facilities.

Outputting the command signal to control inspection of the item may comprise controlling inspection of the item according to the final level of inspection. Controlling inspection of the item in transit may comprise operating a detection device at the transit facility to obtain inspection data for the item in the event that the final level of inspection indicates that the item is to be inspected. The detection device may be selected based on the final level of inspection for the item. Controlling inspection may comprise controlling movement of the item at the transit facility. Controlling movement may comprise moving the item to a location selected based on the final level of inspection for the item. For example, controlling movement may comprise moving the item into a region where the selected data collection unit (detection device) may obtain detection data from the item.

The final level of inspection may be selected based also on a random element, for example so that every item in transit has a non-zero chance of being inspected. The final level of inspection may be selected based on the stored inspection data. The final level of inspection may be selected based also on: (iii) a transit inspection metric indicative of the stored instances of item inspection at the plurality of transit facilities, and (iv) a decision entity metric indicative of stored instances of item inspection associated with the decision entity.

The decision entity may be configured to provide the decided level of inspection based on inspection data associated with the item, and the predicted level of inspection. The item being in transit may comprise both an item en route to the transit facility and an item which is already at the transit facility and is waiting to be inspected. The obtained item data may be representative of the item in transit. The item data may provide an indication of a predicted level of inspection for the item in transit. The indication may take a number of different forms. The indication may be a numerical value such as a percentage chance of a substance of interest being present. The indication may be a predicted action such as an indication to perform a certain type of scan or inspection. The indication may be data on the basis of which a decision could be made without providing output to that effect, such as an image from scan data based on which a decision entity may determine whether or not to perform a physical inspection of the item. It is to be appreciated that in some examples, the item does not provide a literal predicted level of inspection. Rather, the item data is such that based on the item data, a predicted level of inspection may be determined.

The system may comprise a prediction system configured to obtain input data for the item in transit and to determine therefrom the predicted level of inspection for the item. The prediction system may comprise a machine learning element. The system may be configured to train the machine learning element based on at least one of: (i) inspection data obtained from inspection of an item in transit, (ii) the final level of inspection assigned to the item and (iii) the indications for that item.

Outputting a command signal may comprise outputting to a resource (e.g. such as a computer resource). Outputting to a resource may comprise providing an alert in the event that the decided level of inspection for the item is different to the predicted level of inspection. Controlling inspection of the item may comprise determining whether or not to trigger an alert such as an override action (e.g. an action to inspect the item despite the decided level of inspection). Controlling inspection may comprise selecting the final level of inspection for the item. The levels of inspection may be selected from a list which includes an option to perform no further inspection of the item.

In an aspect, there is provided a system for monitoring operation of human operators at a transit facility. The system comprises: a plurality of data collection units located at a plurality of transit facilities; a decision entity, in communication with data collection units at a selected one of the transit facilities; and a server connectable to each of the data collection units. The server comprises: a data store storing inspection data, obtained from the data collection units, indicative of instances of item inspection at the plurality of transit facilities; and a processor coupled to the data store and operable to update the data store based on data gathered at the data collection units. For an item in transit through a transit facility, the system is configured to: obtain item data providing an indication of a predicted level of inspection for the item and provide said item data to the decision entity; obtain, from the decision entity, a decided level of inspection for the item; identify instances in which the predicted level of inspection for the item differs from the decided level of inspection for the item; and for each said instance, in the event that a monitoring metric is greater than a selected threshold, output a command signal to investigate the decided level of inspection. The monitoring metric is indicative of a likelihood that the difference in level of inspection should be investigated and is determined based on an indication of: (i) the predicted level of inspection for the item, and (ii) the decided level of inspection for the item.

Outputting a command signal may comprise triggering an override action so that the item in transit is assigned a different level of inspection to the decided level of inspection. The system may be configured to control inspection of the item according to the different level of inspection. The system may be configured to determine whether or not the decided level of inspection was correct based on an outcome of the inspection of the item, for example the system is configured to output an alert in the event that the decided level was not correct.

The monitoring metric may be determined based on the stored inspection data. The monitoring metric may be determined based also on: (iii) a transit inspection metric indicative of the stored instances of item inspection at the plurality of transit facilities, and (iv) a decision entity metric indicative of stored instances of item inspection associated with the decision entity. The monitoring metric may be determined based also on a random element.

The system may be configured to determine the monitoring metric using a statistical model which takes into account data indicative of at least one of: (i) transit data for the item, (ii) temporal or seasonal data; (iii) inspection data obtained from a detection device operating on the item; (iv) data from a computer-based analysis of the inspection data. Systems described herein may be configured to determine the monitoring metric.

In an aspect, there is provided a method of controlling inspection of an item in transit through a transit facility, wherein the transit facility is part of a system comprising: a plurality of data collection units located at a plurality of transit facilities; a decision entity, in communication with data collection units at a selected one of the transit facilities; and a server connectable to each of the data collection units. The server comprises: a data store storing inspection data, obtained from the data collection units, indicative of instances of item inspection at the plurality of transit facilities; and a processor coupled to the data store and operable to update the data store based on data gathered at the data collection units. The method comprises: obtaining item data providing an indication of a predicted level of inspection for the item and providing said item data to the decision entity; obtaining, from the decision entity, a decided level of inspection for the item; and outputting a command signal to control inspection of the item in accordance with a final level of inspection assigned to the item, wherein the final level of inspection is selected based on an indication of: (i) the predicted level of inspection for the item, and (ii) the decided level of inspection for the item.

In an aspect, there is provided a method of monitoring operation of human operators at a transit facility. The transit facility is part of a system comprising: a plurality of data collection units located at a plurality of transit facilities; a decision entity, in communication with data collection units at a selected one of the transit facilities; and a server connectable to each of the data collection units. The server comprises: a data store storing inspection data, obtained from the data collection units, indicative of instances of item inspection at the plurality of transit facilities; and a processor coupled to the data store and operable to update the data store based on data gathered at the data collection units. For an item in transit through a transit facility, method comprises: obtaining item data providing an indication of a predicted level of inspection for the item and providing said item data to the decision entity; obtaining, from the decision entity, a decided level of inspection for the item; identifying instances in which the predicted level of inspection for the item differs from the decided level of inspection for the item; and for each said instance, in the event that a monitoring metric is greater than a selected threshold, outputting a command signal to investigate the decided level of inspection. The monitoring metric is indicative of a likelihood that the difference in level of inspection should be investigated and is determined based on an indication of: (i) the predicted level of inspection for the item, and (ii) the decided level of inspection for the item.

Aspects of the disclosure may include a computer readable non-transitory storage medium comprising a program for a computer configured to cause a processor to perform any method disclosed herein.

FIGURES

Some embodiments will now be described, by way of example only, with reference to the figures, in which.

In the drawings like reference numerals are used to indicate like elements.

SPECIFIC DESCRIPTION

Embodiments of the present disclosure may collect and utilise inspection data obtained from inspecting a plurality of different items at a plurality of different transit facilities. This data may be used to provide an indication of instances in which a decision entity made a decision to not further inspect an item, but further inspection of the item revealed that the item contained something of interest, such as contraband or people. This data may be processed to provide a statistical model of when a decision entity decides not to further inspect an item that should have been inspected. For example, an average error rate for the entire population of decision entities may be determined. The obtained data, and any outputs from processing it, may be used when determining whether or not to override a command from a decision entity not to further inspect an item. Access to such data may provide improvements in security at transit facilities by the identification of instances a decision not to further inspect an item should be overridden.

Embodiments of the present disclosure may find utility when controlling inspection of an item in transit through a transit facility. Embodiments may be utilised for monitoring the operation of human operators at a transit facility (e.g. operators who may be responsible for deciding not to further inspect an item).

Figure 1:
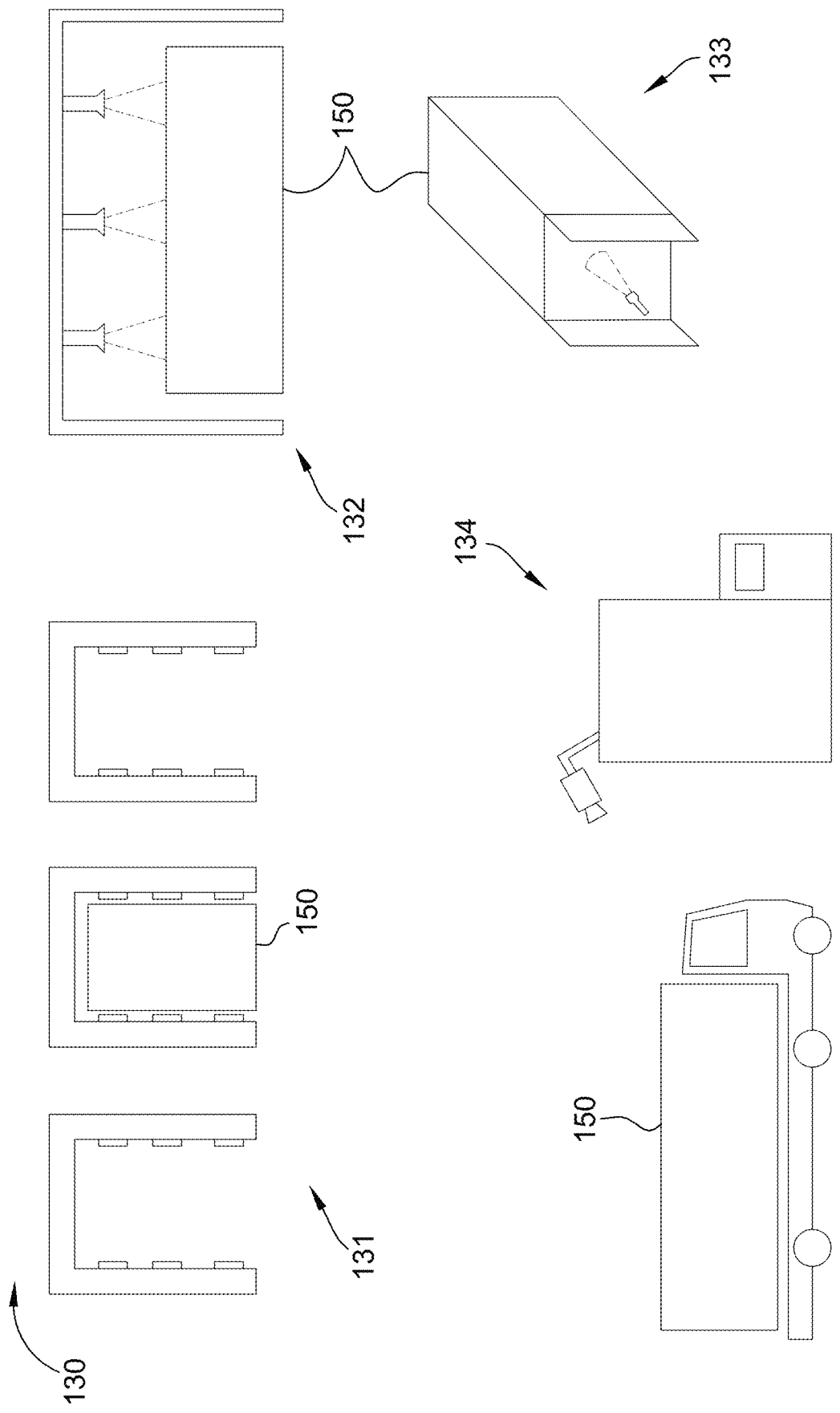
FIG. 1 is a schematic diagram illustrating an example transit facility.

FIG. 1 shows an example of a transit facility 130. Four different regions of the transit facility 130 are shown. The transit facility 130 is located at a first geographical area, such as a customs facility located at the border of customs union (e.g. at a port). The different regions shown in FIG. 1 may correspond to different geographical locations within the transit facility area. The transit facility 130 may comprise different movement control systems such as traffic lights, cranes or rail systems for directing movement of items between the different locations at the transit facility 130. The transit facility 130 may comprise a plurality of different data collection units 131, 132, 133, 134 (such as detection devices) located at different regions of the transit facility 130, wherein each data collection unit is configured to obtain inspection data for the item 150.

A first data collection unit 131 and a second data collection unit 132 are shown. These data collection units may comprise non-intrusive inspection devices such as scanning devices. Scanning devices may include scanners which use penetrating radiation such as X-rays, gamma rays or neutron activation systems. Detection devices may include passive radiation detectors arranged to detect radiation such as muon, gamma or neutron radiation. Detection devices may also include suitable trace detection devices such as spectrometers. It is to be appreciated the nature of the detection device may vary depending on the type of item 150 to be scanned. Detection devices may include 'drive-through' scanners, where an item 150 to be scanned is moved through a detection zone in which scanning occurs.

A third data collection unit 133 is shown. The third data collection unit 133 may comprise an intrusive inspection device. For example, the intrusive inspection device may comprise a system configured for physical inspection of the item 150. Physical inspection of an item 150 may comprise the operation of a detection device inside the item 150, e.g. for a container this may comprise the operation of a suitable detection device inside the container to scan the contents of that container. An intrusive inspection of an item 150 may comprise the removal of the contents from the item 150 so that they may be inspected elsewhere, e.g. so that they may be passed through a suitable detection device such as an X-ray scanner. Physical inspection of an item 150 may comprise operation of machinery, such as robots to perform the physical inspection. For example, in situations where potentially hazardous substances may be present (e.g. poison or explosives), there may be specifically trained and programmed robotic instruments configured to perform relevant scanning operations.

A fourth data collection unit 134 is shown. This may comprise a camera or other suitable means for obtaining image data for the item 150. The fourth data collection unit 134 may comprise a device for sending and receiving transit data about the item 150. Transit data may include data sent before or during transit of the item 150 to the transit facility 130. For example, this transit data may comprise manifest data such as a location of the origin of the item 150 in transit, a party responsible for the item 150, transit facilities that the item 150 has previously been to, a nature of any goods in the item 150 etc. Such a data collection unit 134 may comprise a telecommunications device for sending and receiving network messages. By receiving such messages, the data collection unit 134 may obtain the item data from a remote location such as a ship carrying the item 150. It is to be appreciated that such a data collection unit 134 need not be geographically located at the transit facility 130; it may be located elsewhere. The camera may be linked to the device so that OCR data obtained from an item identifier on the item 150 may be used to obtain any relevant inspection data associated with that item 150 (e.g. including manifest data).

The data collection units of the transit facility 130 may be dispersed about the geographical area the transit facility 130 occupies. Some of the data collection units may not be portable, and so an item 150 in transit may need to be moved to a specific location within the first geographical area so that a selected data collection unit may collect data from that item 150. The data collection units may comprise any devices which are operable to obtain data about an item 150 in transit. For example, obtained data may comprise data based on which a determination about the item 150 may be made, such as a likelihood of the item 150 containing a substance of interest.

Any suitable data collection unit may be used at the transit facility 130. The different data collection units may each be respectively associated with: (i) a time taken to inspect and (ii) a degree of certainty of inspecting using that detection device producing a valid result. Generally, the greater the time taken to inspect, the greater the certainty of an output from the inspection producing the correct result (e.g. a physical inspection may take a long time when compared to analysing manifest data, but it is more likely to provide the correct result).

A transit facility 130 may comprise any facility at a location at which items are to be inspected. For example, this could include any instance of physical infrastructure associated with a customs authority, such as that which could be found at a port or border. It is to be appreciated that the present disclosure may be utilised at any location where items are to be inspected and the transit of the items through that location may be controlled based on the outcome of any inspection. One particular application of this disclosure may be to control the flow of goods or people into a country, wherein laws of that country would prevent certain items (e.g. narcotics) from gaining entry. A transit facility 130 may be spread out over a geographical area, and may include a first region in which items may be received (e.g. from a transporting vehicle such as a ship). The detection devices of the transit facility 130 may be located in different regions of the transit facility 130 to the first region.

An item 150 in transit may comprise an item of cargo, such as a container containing goods. It is to be appreciated that the item 150 could be anything which may pass through a transit facility 130. The item 150 may hold goods which are to be inspected. Example items include shipping containers transporting goods from one region to another. However, it is to be appreciated that the present disclosure may be applicable to any suitable item 150 in transit through a transit facility 130, such as luggage, animals and people.

The transit facility 130 may be associated with a computer such as user equipment ('UE'). The UE may be coupled to the data collection units so that it has access to their output data. The UE may comprise a decision entity (e.g. software configured for making decisions on the basis of the output data). It is to be appreciated that the geographic location of the UE need not be the same as that of the transit facility 130. For example, the UE may be coupled to the data collection units so that data obtained from the data collection units (at the transit facility 130) may be sent to the UE at a different location.

Figure 2:
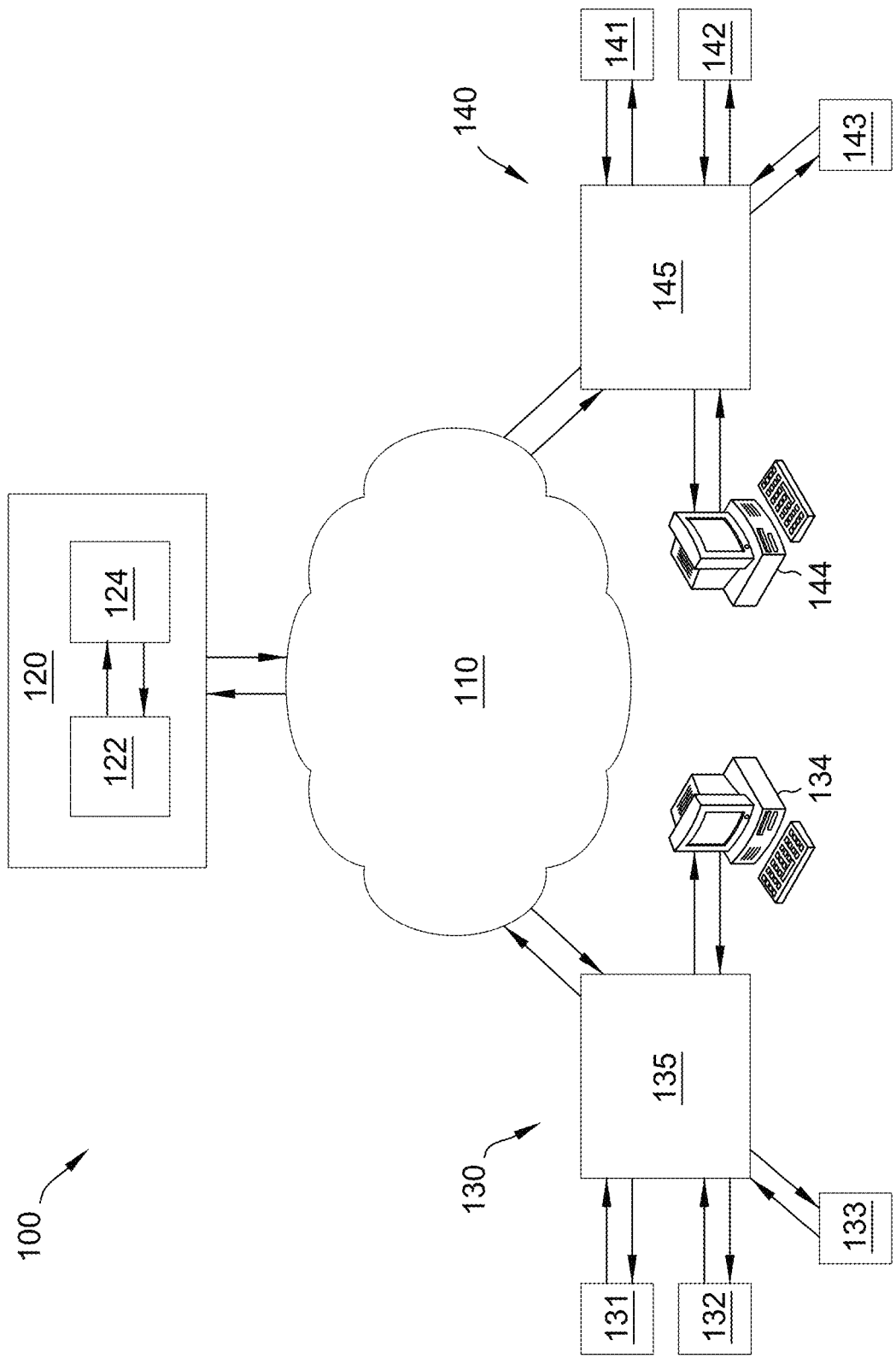
FIG. 2 is a schematic diagram illustrating an example transit control system.

FIG. 2 shows an example of a transit control system 100. The transit control system 100 may be made up of a number of transit control facilities, such as the one shown in FIG. 1. The transit control system 100 shown in FIG. 2 includes a server 120 and two transit facilities 130,140. The server 120 includes a data store 122 and a processor 124. The processor 124 is coupled to the data store 122 so that it may read and write data from/to the data store 122. Each of the server 120 and the transit facilities are coupled to a network 110 so that they may send and receive signals over the network. Each of the transit facilities includes a plurality of data collection units 131,132,133,141,142,143. The data collection units are coupled to user equipment ('UE') 134,144, for example, this may be via a local server or network 135,145.

There may be variations among the different transit facilities of the transit control system 100. Different transit facilities may serve different purposes, or may be directed towards different items. For example, an airport and a sea port may have very different configurations, so as to cope with the different types of item passing through them. Additionally, within any given transit facility 130, there may be a plurality of different types of detection device, and this range may vary between different transit facilities. The selection of devices at a given transit facility 130 may be based on typical items present at that transit facility 130, and the selection of which devices to operate could be selected based on the type of item 150 to be scanned. For example, for containers including lots of metallic goods, detection devices with deeper penetration may be preferable, such as gamma ray scanners.

A transit control system 100 may comprise physical infrastructure associated with a customs authority. This may include a plurality of customs centres located about the customs union, such as at any access points (e.g. ports/borders). It is to be appreciated that there may be a large number of such transit facilities for a given customs union (e.g. one for each land, air or sea port).

The present disclosure will now be described with reference to one transit facility 130 (e.g. as shown in FIG. 1), which forms part of the transit control system 100 (e.g. as shown in FIG. 2). It is to be appreciated that the foregoing description will be applicable to a number of different transit facilities which form part of the transit control system 100. The operation of controlling inspection of an item 150 in transit through the transit facility 130 will now be described with reference to the flowchart of FIG. 3. The method will be described with reference to two specific examples.

In the first example, the item data comprises manifest data for the item 150 in transit. The method comprises determining on the basis of this manifest data how to inspect the item 150, e.g. whether or not to inspect the item 150, and if the item 150 is to be inspected, to what level (e.g. scan or physical inspection.

In the second example, the item data comprises scan data for the item 150 in transit (e.g. as obtained by a data collection unit at the transit facility 130). The item data may also comprise manifest data. On the basis of the item data, the method comprises determining whether or not to physically inspect the item 150.

It is to be appreciated that the two examples may be combined such that a scanning action may be determined based on received manifest data, and then on the basis of scan data obtained from this scan, it is determined whether or not to physically inspect the item 150.

Figure 3:
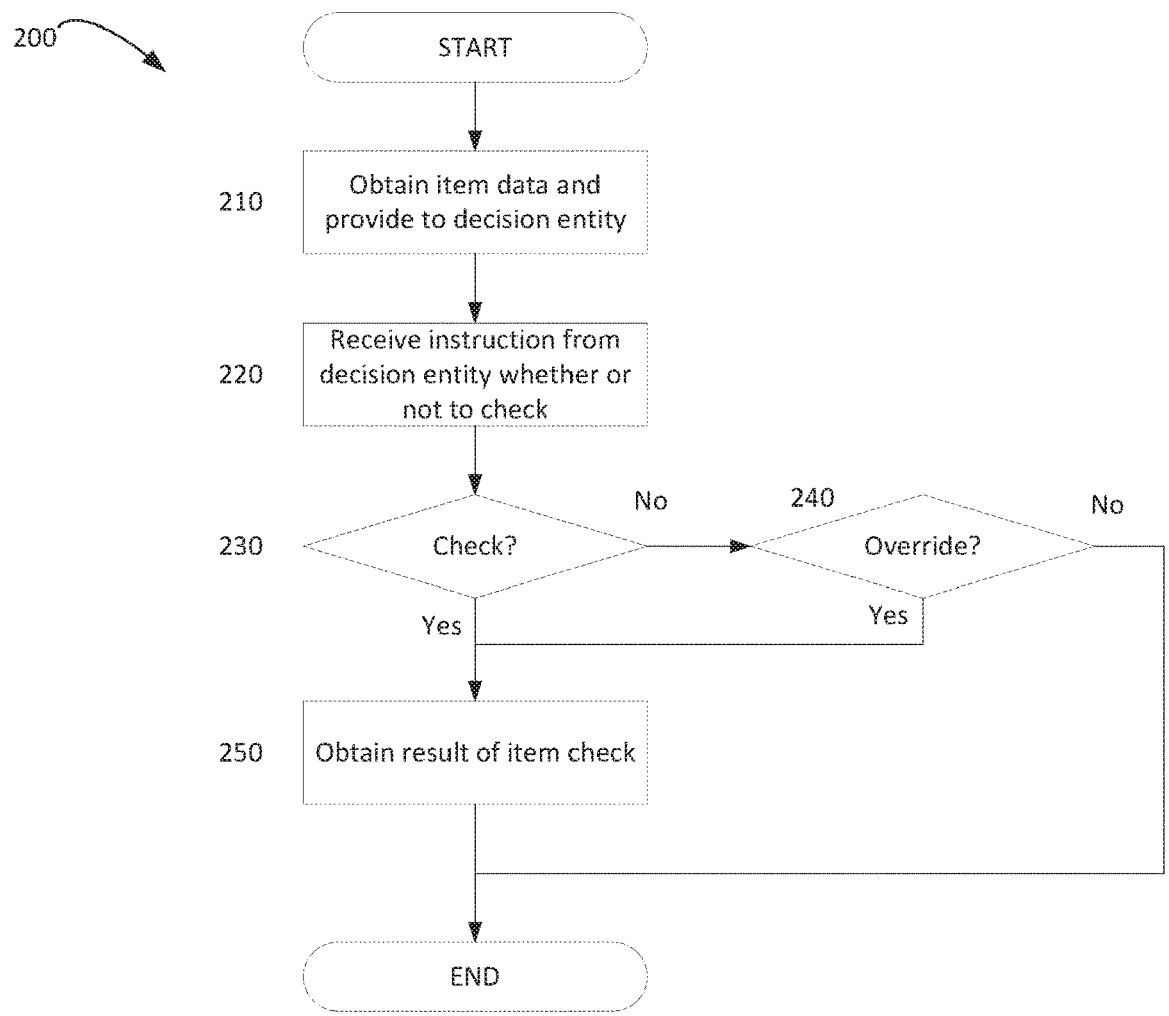
FIG. 3 is a flowchart illustrating an exemplary method of controlling an item in transit through a transit facility.

With regard to the flow chart of FIG. 3, at step 210, item data for the item 150 in transit is obtained. This may be obtained from a data collection unit at the transit facility 130. The item data may provide an indication of a predicted level of inspection for the item 150. The indication may be in the form of a discernible predicted level of inspection, e.g. it may be colour-coded to suggest a particular action. The indication may not actually provide a specific predicted level of inspection; it may provide certain indicators on the basis of which a predicted level may be inferred.

In the first example, the item data may be based on manifest data such as a history of transit for the item 150 (e.g. where it has come from and where it has been before then) and information about the contents of the item 150 (e.g. type of goods, owner). The item data may have been processed to comprise an indication of a predicted level of inspection, or it may simply be the raw manifest data.

In the second example, the item data may comprise the above manifest data. It also comprises obtained scan data for the item 150. The scan data may comprise image data obtained by scanning the item 150 using a data collection unit at the transit facility 130, such as a drive-through gamma ray scanner. The item data may have been processed to comprise an indication of whether or not a physical inspection should be ordered for the item 150. Image data may have a highlighted region of interest, in which image analysis software determined there to potentially be a substance of interest.

Step 210 also comprises providing this obtained item data to a decision entity. The obtained data may be sent over to a network to the decision entity where it may be reviewed. The decision entity may comprise a computer-implemented reviewing system, such as image analysis software and/or a trained machine learning element which is configured to process an input (the item data) and to provide an output which is an indication of a selected inspection instruction. The decision entity will have entity data associated therewith, such as a set of performance statistics for their historical output.

At step 220, an instruction is received from the decision entity. This instruction may also include reasoning for the decision, such as a highlighted region in scan data in which the decision entity considers there to be a substance of interest. The received instruction may provide a decided level of inspection (e.g. a level of inspection for the item 150 as decided by the decision entity). The decided level of inspection may be based on any inspection data associated with the item 150 and/or the predicted level of inspection for the item 150. It may have been based on the predicted level of inspection. The predicted level of inspection may not have been presented to the decision entity, and it may instead only be used as a checking mechanism against the decided level of inspection.

In the first example, the instruction from the decision entity (the decided level of inspection) may be to obtain scan data; it may specify a suggested type of scan data to obtain, such as which of the data collection units to use. The instruction may be to perform a physical inspection of the item 150. The instruction may be to neither scan nor physically inspect the item 150, such as to allow the item 150 to pass through the transit facility 130 without further inspection.

In the second example, the instruction from the decision entity may be to perform a physical inspection of the item 150. The instruction may be that no physical inspection is needed, such as to allow the item 150 to pass through the transit facility 130 without further inspection.

At step 230, it is identified whether or not the instruction from the decision entity is to perform any further inspection of the item 150 (e.g. to scan/physically inspect). The instruction from the decision entity may be a direct command such as inspect/do not inspect (it may also include the type of inspection). The instruction may be a numerical output such as an indication that there is an 80% chance of substance of interest being present. In which case, step 230 may comprise comparing such a value to a known reference value, and deciding based on this comparison.

In the first example, the checking step may comprise checking whether or not any further inspection is required by the decided level of inspection.

In the second example, the checking step may comprise checking whether or not a physical inspection of the item 150 is required by the decided level of inspection.

If at step 230, the method identifies that further inspection was not indicated by the decided level of inspection, the method proceeds to step 240. At step 240, the method comprises determining whether or not to follow the decided level of inspection. At this stage, the method comprises determining whether or not to override the decided level of inspection. This determination is made based on an aggregate statistical analysis (e.g. statistics based on an aggregation of data from a plurality of transit facilities in the transit control system 100), methods of which are described in more detail below. The outcome of this analysis is to determine whether or not the decided level of inspection should be followed. Based on the outcome of the check/override steps, a final level of inspection is determined. The final level of inspection may be based on an indication of both: the predicted level of inspection and the decided level of inspection.

The data store 122 of the server 120 may store data from all of the transit facilities in the transit control system 100. The processor 124 may access the data store 122 to determine the final level of inspection for the item 150 based on data stored in the data store 122 for all of the transit facilities in the transit control system 100. The data store 122 may also store data representative of the decision entity responsible for the decided level of inspection for the item 150. It may also store data representative of other decision entities (such as decision entities associated with different transit facilities within the transit control system 100).

After the check/override steps 230, 240 have been performed, inspection of the item 150 is controlled accordingly. This may comprise physically moving the item 150 based on the final level of inspection. Controlling inspection of the item 150 may comprise first locating the item 150 at the transit facility 130. This may be done based on received data for the vehicle by which the item 150 arrived at the transit facility 130. It is to be appreciated that a container ship arriving at a port may have over 19 000 containers on board, and so received data from the vehicle may comprise a specific location aboard the vessel for the item 150. For example, the method may comprise controlling a crane to lift the selected item 150 off its vehicle. The transit facility 130 may comprise cameras which are arranged to obtain image data for each vehicle arriving at the transit facility 130. Based on OCR (optical character recognition) analysis of obtained images of a vehicle, items carried by the vehicle may be identified as they typically have item identifiers printed on them (e.g. for containers, these may be printed on the outside of the container). Based on this identification of the items, their location may also be determined.

Once the item 150 has been located, its movement through the transit facility 130 may be controlled based on a command signal which provides an indication of the final level of inspection. In the event that the final level of inspection indicates a selected data collection unit with which to obtain inspection data from the item 150, the method comprises moving the container into a region of the transit facility 130 where the data collection unit may be operated to obtain such inspection data from the item 150. In the event that the final level of inspection indicates that no further data collection unit-based inspection of the item 150 is needed, the method may comprise moving the item 150 into a region of the transit facility 130 so that it may pass through the transit facility 130. For example, this may comprise moving a container on to the back of a lorry which may then drive away from the transit facility 130. If the outcome of step 240 is a no, then the method may comprise moving the item 150 so that it may pass through the transit facility 130 without further inspection (e.g. without further inspection from one of the detection devices).

In the first example, based on the received manifest data, the outcome of steps 230,240 may comprise a final level of inspection which is to operate a detection device to scan the item 150. In which case, the method may comprise moving the item 150 into a region so that the detection device may operate to inspect the item 150. In the event that the final level of inspection is to physically inspect the item 150, the method may comprise moving the item 150 into a region so that physical inspection of the item 150 may occur (e.g. this region may be different to the region in which the detection device may operate). In the event that the final level of inspection is to not inspect, the method may comprise moving the item 150 through the transit facility 130 so that it may leave the transit facility 130.

In the second example, based on the received scan data for the item 150, the final level of inspection may be to physically inspect the item 150; it may be to perform no further inspection. The final level of inspection may be to perform another and/or a different type of non-invasive scan of the item 150. Again, the movement of the item 150 about the transit facility 130 may be controlled based on the final level of inspection for the item 150. For example, the location of the transit facility 130 into which the item 150 is moved may be selected based on the final level of inspection and the location of regions of the transit facility 130 in which the final level of inspection may be performed.

It is to be appreciated in the context of this disclosure that movement of the item 150 may take any number of forms. The exact form of this movement may depend on the type of item 150 to be moved and the type of transit facility 130. For example, when moving containers, trains, cranes, lorries and boats may all be utilised. A command signal for controlling inspection of the item 150 may comprise an indication of a location for the item 150 to be delivered to. It may also comprise an indication of a present location of the item 150. Based on the command signal, movement of the item 150 at the transit facility 130 may be controlled so that the item 150 is moved to a selected location (e.g. which is based on the item's final level of inspection).

In the event that the outcome of either of steps 230 or 240 is to check the item 150 (e.g. the final level of inspection is to perform a check), the item 150 is located and moved to a selected location for a selected data collection unit to obtain inspection data for the item 150. The method may comprise operating the selected data collection unit (e.g. as selected based on the final level of inspection for the item 150) on the item 150 to obtain inspection data for the item 150.

At step 250, the inspection data for the item 150 is obtained. As a result of the transit control system 100 and method of using thereof described herein, a greater number of items containing a substance of interest may be detected. For example, these may reduce the number of instances in which a decided level of inspection (as decided by a decision entity) incorrectly determines that no further checking is needed for an item 150 which does include a substance of interest. The described system and method provide an efficient way of identifying such instances of false-negatives as only a select number of the negatives will be overridden. The select number of negatives may be identified more efficiently through the use of stored inspection data for the plurality of transit facilities, e.g. for use in the aggregate statistical analysis methods described in more detail below.

Example methods of aggregate statistical analysis will now be described with reference to FIG. 2. The aggregate statistical analysis is configured to recognise trends in the inspection data which may provide an indication of, for a given item 150 in transit, the likelihood of the decided level of inspection being an incorrect one.

The data store 122 of the server 120 stores data associated with the plurality of transit facilities. Although only two are shown in FIG. 2, there may be more transit facilities associated with the same server 120 and data store 122. The data store 122 stores inspection data from each of the associated transit facilities. The processor 124 of the server 120 has access to the data store 122 to use this data for aggregate statistical analysis when controlling inspection of an item 150 at any one of the transit facilities associated with the server 120.

Inspection data may comprise data associated with items in transit through any of the transit facilities. For example, inspection data may comprise data obtained by using a data collection unit to collect data for an item 150 in transit. The processor 124 may be configured to receive a new item of data in the event that data is collected from a data collection unit, and to update the data store 122 accordingly. Each item of inspection data may correspond to an item 150 which historically was in transit through one of the transit facilities. Each item of inspection data may comprise certain items of data associated therewith, such as an indication of at least one of: (i) a predicted level of inspection, (ii) a decided level of inspection, (iii) a decision entity responsible for the decided level of inspection, (iv) a final level of inspection and (v) an outcome from any inspections of the item 150. Each item of data which forms the inspection data may be stored in an immutable data format so that they cannot be changed retrospectively. Data regarding decided levels of inspection may be stored associated with their responsible decision entity.

Using this inspection data, it may be possible to identify situations in which a decision entity decided on a decided level of inspection which turned out to be an incorrect decision (e.g. because an override occurred which revealed the presence of a substance of interest). These situations can be linked to their responsible decision entity. Using this data, it is possible to obtain a decision entity metric for each decision entity. For each decision entity, their respective decision entity metric may provide an indication of their reliability, e.g. it may provide an indication of the proportion of instances of item inspection associated with that decision entity which were assigned an incorrect level of inspection. The decision entity may be computer-implemented, in which case, the decision entity metric may provide an indication of the reliability of the computer code/software. This may then be used when updating computer code, e.g. to identify scenarios in which the decision entity is less good at making the correct decision.

Using the inspection data and/or the decision entity metrics it may be possible to determine a transit inspection metric. The transit inspection metric may provide an indication of a global average for decision entities associated with the transit control system 100. This may provide a benchmark against which individual decision entities may be compared. It is to be appreciated that the combination of these two metrics may be used to provide an indication of reliability for each decision entity. As set out below in more detail with reference to FIG. 4, this may be used when determining whether or not to perform an override at step 240 of the method 200 of FIG. 3.

Using the stored inspection data, other metrics may also be determined and/or the metrics defined/used may be more specific than that described above. For example, metrics may be used which are focused on inspection data which more closely relates to the item 150 in transit, such as metrics for all data relating to items having the same origin, the same owner or the same type of goods etc. The provision of more specific metrics may enable the identification of trends to a higher degree of certainty that the identified trend represents a causal link.

The stored inspection data and/or the obtained metrics may be used in step 240 of the method 200 of FIG. 3. This step 240 will now be described in more detail with reference to FIG. 4.

Figure 4:
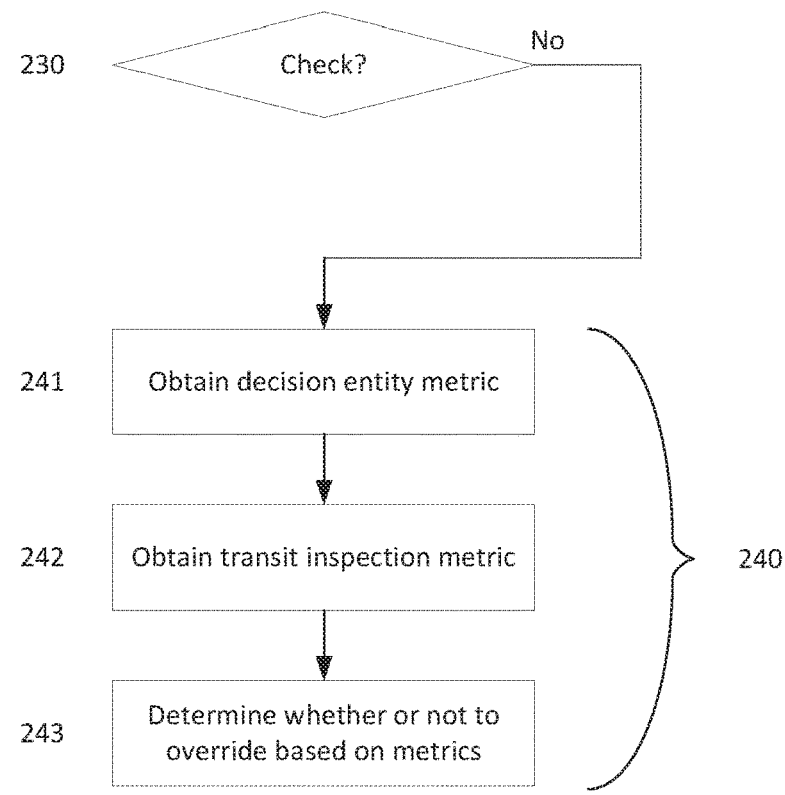
FIG. 4 is a flowchart illustrating exemplary steps in a method of controlling an item in transit through a transit facility.

FIG. 4 shows an expanded version of steps 230 and 240 of FIG. 3. Step 230 remains the same, but step 240 has been expanded into three steps 241,242,243 which may be used when determining whether or not to override the decided level of inspection.

At step 241, a decision entity metric is obtained for the decision entity responsible for the decided level of inspection. Obtaining the decision entity metric may comprise determining it on-the-fly using the present contents of the data store 122 (e.g. the inspection data stored in the data store 122 at the time of obtaining). Obtaining the decision entity metric may comprise retrieving (e.g. from the data store 122) a pre-determined decision entity metric for the decision entity.

At step 242, a transit inspection metric is obtained which is representative of a plurality of decision entities associated with a plurality of transit facilities within the transit control system 100. As with the decision entity metric, obtaining the transit inspection metric may comprise determining it on-the-fly, or it may comprise retrieving a pre-determined transit inspection metric.

At step 243 it is determined whether or not to override based at least in part on at least one of: (i) the predicted level of inspection, (ii) the decided level of inspection, (iii) the decision entity metric and (iv) the transit inspection metric. As discussed below in more detail, it may also be determined using a random element. This step may comprise determining a final level of inspection for the item 150 in transit. The final level of inspection may be based on the stored inspection data, or indications thereof.

The final level of inspection may be determined based on an indication of a scale of the difference between the predicted level of inspection and the decided level of inspection. Depending on the nature of the transit facility 130, there may be a plurality of different options for the level of inspection. In such cases, there could be two types of inspection level which may be considered reasonably close in terms of thoroughness of inspection (e.g. gamma ray scan and X-ray scan). When the difference between the predicted and decided inspection levels is less substantial, this may be less of a flag to override. Conversely, where this difference is larger, such as where the predicted level of inspection was a full physical inspection of the item 150 and the decided level of inspection was to not inspect at all, this may be considered to be a sizeable difference, and thus more of a flag to override.

The final level of inspection may be determined based on an indication of a difference between the transit inspection metric and the decision entity metric. Each of these metrics may be represented numerically, such as a percentage chance of the decided level of inspection being correct or a percentage chance that the decided level of inspection would provide a false-negative result. The difference between the two values may be an indication of the magnitude of the difference and an indication of which metric is greater. As the stored inspection data is representative of decision entities spread about the transit control system 100, the transit inspection metric may provide more insight into the reliability of an individual decision entity because it may facilitate comparison between their decision entity metric and a global average. When determining whether or not to override a no scan command, the use of this comparison may enable identification of a greater number of items which should be scanned. It is to be appreciated that this indication of a difference may contribute to the determination of the final level of inspection so that the likelihood of an override is proportional to the magnitude of the difference between the two metrics (e.g. a decision entity having a decision entity metric much greater than the transit inspection metric is less likely to receive an override command than a decision entity whose decision entity metric is less than the transit inspection metric).

The final level of inspection may be determined based on an indication that one of the predicted and decided levels of inspection is of a high rank (e.g. a substantial inspection, such as a physical inspection of the item 150). These scenarios may be considered to be more likely to be worth investigating. Likewise, the final level of inspection may be determined based on an indication that one of the transit inspection metric and the decision entity metric are particularly high or low. For example, absolute values (rather than relative values) may be considered as a decision entity with a low value for their decision entity metric is likely to warrant more overrides even if their value is close to the transit inspection metric.

The final level of inspection may be determined based on a random element. The introduction of a random element may be arranged so that every item 150 in transit has a non-zero chance of being inspected. For example, this may enable a greater number of false-negatives to be identified as no 'no inspection command' is ever guaranteed not to be overridden. The random element may be independent from any other metrics or there may be some dependency. For example, the size of the random element may be determined based on one of the other metrics, such as being scaled based on the decision entity metric. The random element may therefore be selected so that decision entities with lower decision entity metrics are more likely to have their decided levels of inspection 'randomly' overridden.

The determination of the final level of inspection may be performed by a conclusion entity. The conclusion entity may include a computer-implemented system. This system may be arranged to determine a combined inspection metric (e.g. a numeric value) based on its received inputs (e.g. at least one of: the decision entity metric, the transit inspection metric, the predicted level of inspection, the decided level of inspection and the random element). Depending on a value for the combined inspection metric, the system may assign the item 150 a final level of inspection (e.g. different output values may map on to different bins, each of which is associated with a respective level of inspection; there may be different threshold values associated with different levels of inspection).

It is to be appreciated that conclusion entities may be monitored in the same way as described herein with regard to monitoring decision entities. For example, each conclusion entity could have a respective conclusion entity metric, which could be used when assessing whether or not to accept a final level of inspection determined by a conclusion entity.

Figure 5:
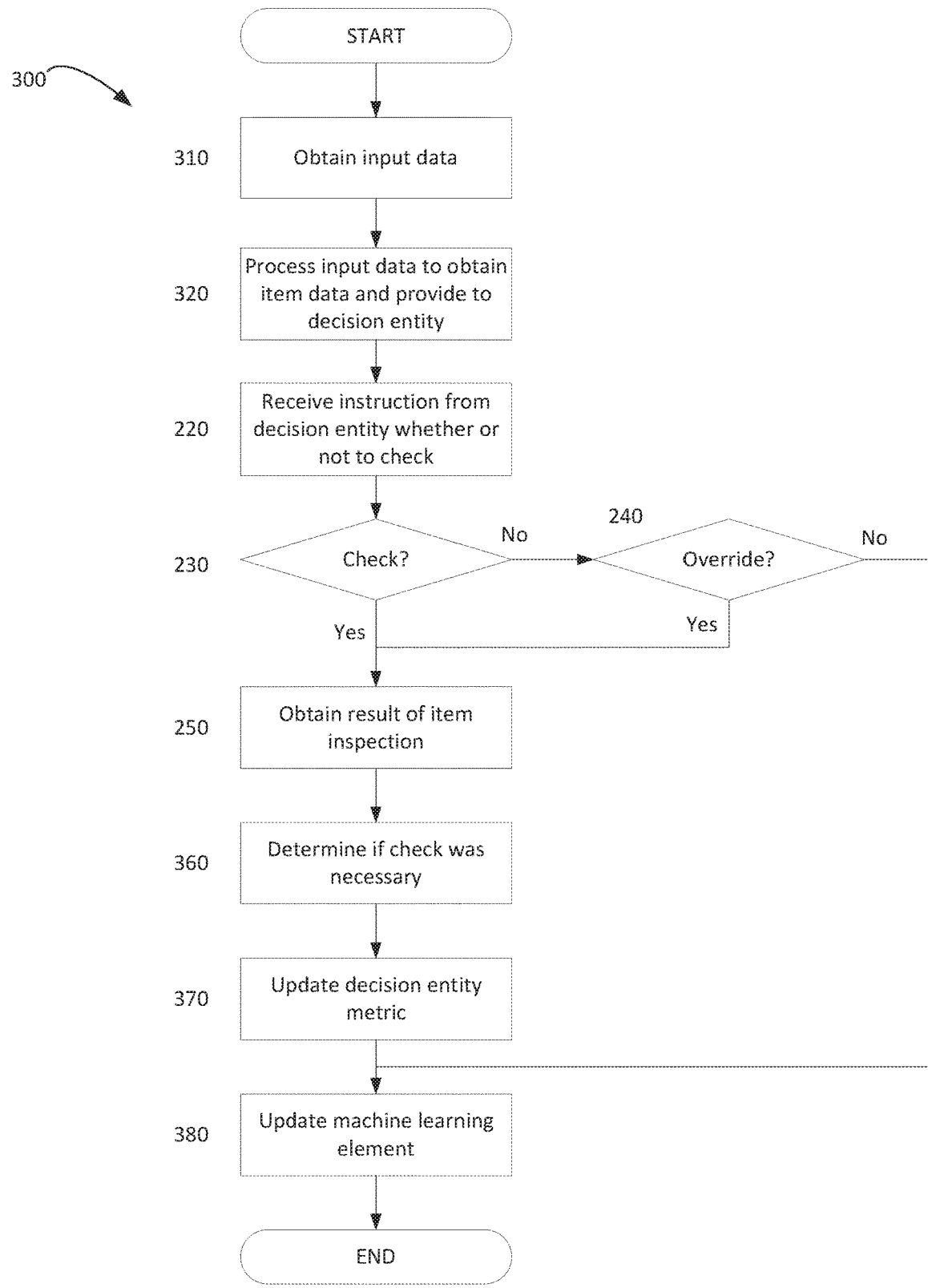
FIG. 5 is a flowchart illustrating an exemplary method of controlling an item in transit through a transit facility.

FIG. 5 will now be described. Additional steps of the method 300 of FIG. 5 (in relation to the method 200 of FIG. 3) will now be described with reference to FIG. 5. FIG. 5 shows a flowchart of a method 300. Steps 220, 230, 240 and 250 of method 300 correspond to the steps previously described with those reference numerals, and so shall not be described again.

Method 300 differs from method 200 in that the transit control system 100 comprises a prediction system (e.g. in the server 120) arranged to determine the predicted level of inspection based on obtained input data for the item 150 in transit. The prediction system comprises a machine learning element, and the method may comprise training of the machine learning element using at least one of: (i) inspection data obtained from inspection of an item 150 in transit, (ii) the final level of inspection assigned to the item 150 and (iii) the indications for that item 150 (e.g. at least one of: the decision entity metric, the transit inspection metric, the predicted level of inspection, the decided level of inspection). Use of such data when training the machine learning element may provide improved training of the prediction system, which in turn may provide an improved prediction system. This may increase the efficiency of the transit control system 100.

At step 310, input data for the item 150 in transit is obtained. In this context, input data comprises raw data such as data which does not include an indication of a predicted level of inspection. For the item 150 in transit, the input data could comprise received manifest data for the item 150 and/or it could comprise scan data for the item 150.

At step 320, the input data is processed to obtain item data which is provided to the decision entity. As above, the item data may comprise a predicted level of inspection for the item 150 in transit. It is to be appreciated that the machine learning element of the prediction system may determine the predicted level of inspection in a number of ways. The machine learning element may comprise a neural network which is trained to operate on a specific input format of data. For example, the input data may be image data from a scan of the item 150, and the neural network may comprise a suitable neural network (e.g. convolutional, deep residual or capsule) for analysing the image data to identify potential substances of interest. For example, the input data may comprise alphanumeric strings organised in a tabular format, and the neural network may comprise any suitable neural network to analyse this input data.

The prediction system may be configured to determine a numeric value representative of a probability that the item 150 contains a substance of interest. For example, image analysis of a scan of an item 150 may reveal that there is a 93% chance of guns being included in the item 150. This numeric value may then be compared to several selected thresholds. Depending on which thresholds this value exceeds, a predicted level of inspection for the item 150 may be determined.

Once the item data is determined, the item data is provided to the decision entity so that the decision entity may provide a decided level of inspection for the item 150. The decision entity may make this decision based on the item data and any other stored inspection data for the item 150. The method 300 continues as in method 200 until step 360.

At step 360, the predicted, decided and final levels of inspection are known. Additionally, an outcome of any item inspection will be known. This outcome may comprise an indication that no substance of interest was present in the item 150, or that a substance of interest was present in the item 150. If the inspection was a physical inspection, it may be known to a high degree of certainty that there was or was not any substance of interest present. If the inspection was non-invasive such as a scan of the item 150, it may be known to a less high degree of certainty that there was or was not any substance of interest present. However, in each case, a final decision on the outcome of item inspection will have been made, and this decision will be known.

At step 360, a comparison may be performed between the outcome of the item inspection and the predicted level of inspection. This enables the identification of whether or not the predicted level of inspection in the item data was correct or not, and if it was not correct, by how much the predicted level of inspection differed from the correct level of inspection. A correct predicted level of inspection may comprise providing a predicted level of inspection corresponding to a physical inspection when a substance of interest is found. Likewise, a predicted level of inspection of 'do not inspect' could be a correct prediction when there is no substance of interest found. The difference between the correct and predicted level of inspection may be determined based on numeric values used when determining the predicted level of inspection, and how much that numeric value differed from e.g. 100% and 0% chance of the substance of interest being present.

At step 360, a comparison may be performed between the outcome of the item inspection and the decided level of inspection. As above, such a comparison may enable the identification of whether or not the decided level of inspection was correct or not, and if it was not correct, by how much it was not correct.

At step 370, the decision entity metric for the decision entity responsible for the decided level of inspection is updated. The update may be based on the comparison of the decided level of inspection and the outcome of the inspection. The decision entity metric may comprise a percentage of correct decisions by the decision entity. However, it may be determined based on other factors, such as the predicted level of inspection (e.g. so as to avoid overly penalising a decision entity for getting a tough call wrong). To this effect, there may be some sort of weighting applied when determining the updated decision entity metric. The outcome of the inspection, as well as the predicted, decided and final levels of inspection may be added to the data store 122 as inspection data.

At step 380, the machine learning element may be updated based on the comparison between the outcome of the item inspection and the predicted level of inspection. This may comprise an update to the machine learning element using a gradient descent back-propagation algorithm. The machine learning element may be updated based also on at least one of the decided level of inspection and the final level of inspection so as to identify instances in which the machine learning element determined an incorrect level of inspection, but that this was consistent with a decision made by the decision entity as well (e.g. the error was more of a marginal call than in other situations).

If the outcome of the override determination at step 240 is negative, the method may proceed to step 380. In this case, at step 380, the machine learning element may be updated based on the predicted level of inspection, the decided level of inspection and the decision entity metric. The decision entity metric may provide an indication of the likelihood of the decision entity determining a correct decided level of inspection. There is always a chance that the decided level of inspection is incorrect and that this is not overridden. However, in many cases, the decided level of inspection may be correct, and it may be useful to update the machine learning element based on a difference between the predicted and decided levels of inspection. This update may be based on the decision entity metric (and optionally the transit inspection metric) to account for possible inaccuracies in the decided level of inspection. For example, a difference between the predicted and decided levels of inspection may be weighted based on the transit inspection metric so that any updates to the prediction system are less substantial when a decision entity with a lower decision entity metric is responsible for the decided level of inspection.

Although not shown, it is to be appreciated that if determining whether or not to override in step 240 uses any machine learning related technology, a comparison between the outcome of the item inspection and the final level of inspection may be used to update this machine learning technology.

Embodiments of the disclosure have been described herein in relation to controlling the inspection of an item 150 in transit through a transit facility 130. However, the disclosure also encompasses systems and methods for monitoring operation of human operators at a transit facility 130. In this context, the system may be arranged to identify instances in which a predicted level of inspection for an item 150 differs from a decided level of inspection for the item 150. For each said instance, a monitoring metric may be determined for the operator for that instance. If the monitoring metric is greater than a selected threshold this may provide an indication that the difference in level of inspection should be investigated, and a command signal may be output to this effect. Outputting a command signal may comprise performing an override action (e.g. as in step 240 discussed above). Outputting a command signal may comprise providing an alert that this instance warrants further scrutiny (e.g. by a conclusion entity as described above).

The monitoring metric may be determined based on an indication of: (i) the predicted level of inspection for the item 150, and (ii) the decided level of inspection for the item 150. It may be determined based also on: (iii) a transit inspection metric, and (iv) a decision entity metric for the human operator. As described above with reference to the final inspection metric, the monitoring metric may be determined based on the indications of the stored inspection data, and/or a random element.

The system may be configured to determine whether or not the decided level of inspection was correct based on an outcome of the inspection of the item 150. As with the methods described above, after an outcome of the inspection has been obtained, instances may be identified in which a decided level of inspection for the item 150 in transit was incorrect. In such events, an alert may be output which indicates this, and/or stores a record of this data so that e.g. a decision entity metric for the human operator may be updated. This may enable improved instances for identifying possible fraudulent behaviour by operators at the transit facility 130.

It is to be appreciated that statistical models described herein, such as with regard to the aggregate statistical analysis when determining a final level of inspection and/or a monitoring metric for a user at a transit facility 130 may take into account other factors as well. For example, data indicative of at least one of: (i) transit data for the item 150, (ii) temporal or seasonal data; (iii) inspection data obtained from a detection device operating on the item 150; (iv) data from a computer-based analysis of the inspection data may be used. As an example, this may be suitable for identifying substances of interest which have temporal or seasonal dependencies. For example, certain drugs or narcotics may only grow in some seasons, and so these would be more likely to arrive at certain times of year. Likewise, shipping contraband may occur less frequently during periods of bad weather (or sailing conditions). Such factors could be included when performing a suitable statistical analysis.

It is to be appreciated that the terms "predicted" and "suggested" may be used interchangeably. For example, the phrase "predicted level of inspection" encompasses a "suggested level of inspection".

It will be appreciated from the discussion above that the embodiments shown in the figures are merely exemplary, and include features which may be generalised, removed or replaced as described herein and as set out in the claims. With reference to the drawings in general, it will be appreciated that schematic functional block diagrams are used to indicate functionality of systems and apparatus described herein. In addition the processing functionality may also be provided by devices which are supported by an electronic device. It will be appreciated however that the functionality need not be divided in this way, and should not be taken to imply any particular structure of hardware other than that described and claimed below. The function of one or more of the elements shown in the drawings may be further subdivided, and/or distributed throughout apparatus of the disclosure. In some embodiments the function of one or more elements shown in the drawings may be integrated into a single functional unit.

As will be appreciated by the skilled reader in the context of the present disclosure, each of the examples described herein may be implemented in a variety of different ways. Any feature of any aspects of the disclosure may be combined with any of the other aspects of the disclosure. For example method aspects may be combined with apparatus aspects, and features described with reference to the operation of particular elements of apparatus may be provided in methods which do not use those particular types of apparatus. In addition, each of the features of each of the embodiments is intended to be separable from the features which it is described in combination with, unless it is expressly stated that some other feature is essential to its operation. Each of these separable features may of course be combined with any of the other features of the embodiment in which it is described, or with any of the other features or combination of features of any of the other embodiments described herein. Furthermore, equivalents and modifications not described above may also be employed without departing from the invention.

Certain features of the methods described herein may be implemented in hardware, and one or more functions of the apparatus may be implemented in method steps. It will also be appreciated in the context of the present disclosure that the methods described herein need not be performed in the order in which they are described, nor necessarily in the order in which they are depicted in the drawings. Accordingly, aspects of the disclosure which are described with reference to products or apparatus are also intended to be implemented as methods and vice versa. The methods described herein may be implemented in computer programs, or in hardware or in any combination thereof. Computer programs include software, middleware, firmware, and any combination thereof. Such programs may be provided as signals or network messages and may be recorded on computer readable media such as tangible computer readable media which may store the computer programs in non-transitory form. Hardware includes computers, handheld devices, programmable processors, general purpose processors, application specific integrated circuits (ASICs), field programmable gate arrays (FPGAs), and arrays of logic gates.

Certain features of the systems or methods described herein may be implemented by humans. The decision entity may comprise a human, and the decision entity metric may provide an indication of the skill of the human. The decision entity metric may provide an indication of potential instances of fraud for a human, e.g. if a given human appears to repeatedly make incorrect decisions for a select group of item owners. A decision entity may comprise a combination of both computer and human operation. For example, a computer-implemented system may provide an output to a human, which the human may use when making the decision. Likewise, the conclusion entity may include, at least in part, a human. The human may be provided with relevant obtained information, such as at least one of: the decision entity metric, the transit inspection metric, the predicted level of inspection, the decided level of inspection and the random element. On the basis of this information, they may make a decision about whether or not to override. The human may be provided with a determined recommendation of whether or not to override. For example, this determined recommendation may correspond to the final level of inspection determined by a computer-implemented system, as described above. The UE 134 shown in FIG. 2 may provide a decision entity (e.g. a human operator) with an indication of the output data so that the decision entity may make a decision on the basis of the output data. The decision entity may comprise a human operator who reviews this item data.

For example, embodiments illustrated show a transit control system 100 being made up of multiple components and devices. However, it is to be appreciated that this division is not to be considered limiting, and their functionality may be provided by a single component, or multiple different components. Likewise, communication is discussed between these components/devices; although, the exact communication path is not to be considered limiting. For example, the data collection units may communicate directly with the decision entity.

Any processors used in the server 120 or other computer-based components (and any of the activities and apparatus outlined herein) may be implemented with fixed logic such as assemblies of logic gates or programmable logic such as software and/or computer program instructions executed by a processor. The server 120 may comprise a central processing unit (CPU) and associated memory, connected to a graphics processing unit (GPU) and its associated memory. Other kinds of programmable logic include programmable processors, programmable digital logic (e.g., a field programmable gate array (FPGA), a tensor processing unit (TPU), an erasable programmable read only memory (EPROM), an electrically erasable programmable read only memory (EEPROM), an application specific integrated circuit (ASIC), or any other kind of digital logic, software, code, electronic instructions, flash memory, optical disks, CD-ROMs, DVD ROMs, magnetic or optical cards, other types of machine-readable mediums suitable for storing electronic instructions, or any suitable combination thereof. Such data storage media may also provide the data store 122 of the server 120 (and any of the apparatus outlined herein).

In some examples, one or more memory elements can store data and/or program instructions used to implement the operations described herein. Embodiments of the disclosure provide tangible, non-transitory storage media comprising program instructions operable to program a processor to perform any one or more of the methods described and/or claimed herein and/or to provide data processing apparatus as described and/or claimed herein.

The user equipment illustrated in FIG. 2 may comprise a mobile telecommunications handset, but it will be appreciated in the context of the present disclosure that this encompasses any user equipment (UE) for communicating over a wide area network and having the necessary data processing capability. It can be a hand-held telephone, a laptop computer equipped with a mobile broadband adapter, a tablet computer, a Bluetooth gateway, a specifically designed electronic communications apparatus, or any other device. It will be appreciated that such devices may be configured to determine their own location, for example using global positioning systems GPS devices and/or based on other methods such as using information from WLAN signals and telecommunications signals. The user device may comprise a computing device, such as a personal computer, or a handheld device such as a mobile (cellular) telephone or tablet. Wearable technology devices may also be used. Accordingly, the communication interface 38 of the devices described herein may comprise any wired or wireless communication interface such as WI-FI®, Ethernet, or direct broadband internet connection, and/or a GSM, HSDPA, 3GPP, 4G or EDGE communication interface.

Messages described herein may comprise a data payload and an identifier (such as a uniform resource indicator, URI) that identifies the resource upon which to apply the request. This may enable the message to be forwarded across the network to the device to which it is addressed. Some messages include a method token which indicates a method to be performed on the resource identified by the request. For example these methods may include the hypertext transfer protocol, HTTP, methods "GET" or "HEAD". The requests for content may be provided in the form of hypertext transfer protocol, HTTP, requests, for example such as those specified in the Network Working Group Request for Comments: RFC 2616. As will be appreciated in the context of the present disclosure, whilst the HTTP protocol and its methods have been used to explain some features of the disclosure other internet protocols, and modifications of the standard HTTP protocol may also be used.

As described herein, network messages may include, for example, HTTP messages, HTTPS messages, Internet Message Access Protocol messages, Transmission Control Protocol messages, Internet Protocol messages, TCP/IP messages, File Transfer Protocol messages or any other suitable message type may be used.

Other examples and variations of the disclosure will be apparent to the skilled addressee in the context of the present disclosure.

The invention claimed is:

1. A system for inspecting items in transit through a transit facility, wherein the system comprises:
   a plurality of data collection units located at a plurality of transit facilities;
   a decision entity, in connection with the data collection unit at a selected one of the transit facilities;
   a server connectable to each of the data collection units, the server comprising:
      a data store storing inspection data, obtained from the data collection units, indicative of instances of item inspection at the plurality of transit facilities; and
      a processor coupled to the data store and operable to update the data store based on data gathered at the data collection units;
   a prediction system, comprising a machine learning element, and being configured to obtain input data for an item in transit and to determine therefrom a predicted level of inspection for said item; and
   a computer implemented conclusion entity configured to determine a final level of inspection for an item in transit based on an indication of: (i) the predicted level of inspection for said item, (ii) a decided level of inspection for said item, and (iii) a random element;

wherein, for an item in transit through a transit facility, the system is configured to:
obtain item data providing an indication of the predicted level of inspection for the item and provide said item data to the decision entity;
obtain, from the decision entity, the decided level of inspection for the item;
operate the computer implemented conclusion entity to determine the final level of inspection for the item; and
control inspection of the item according to the determined final level of inspection for the item, wherein controlling inspection of the item in transit comprises operating a detection device at the transit facility to obtain inspection data for the item in the event that the final level of inspection indicates that the item is to be inspected, wherein the detection device is selected based on the determined final level of inspection for the item;
wherein the system is configured to train the machine learning element of the prediction system based on: (a) the final level of inspection assigned to the item in transit, and (b) inspection data obtained from inspection of the item.

2. The system of claim 1, wherein controlling inspection comprises controlling movement of the item at the transit facility.

3. The system of claim 2, wherein controlling movement comprises moving the item to a location selected based on the final level of inspection for the item.

4. The system of claim 1, wherein the final level of inspection is selected based also on the stored inspection data.

5. The system of claim 1, wherein the final level of inspection is selected based also on: (iii) a transit inspection metric indicative of the stored instances of item inspection at the plurality of transit facilities, and (iv) a decision entity metric indicative of stored instances of item inspection associated with the decision entity.

6. The system of claim 1, wherein the decision entity is configured to provide the decided level of inspection based on inspection data associated with the item, and the predicted level of inspection.

7. A system for monitoring operation of human operators at a transit facility, wherein the system comprises:
a plurality of data collection units located at a plurality of transit facilities;
a decision entity, in communication with data collection units at a selected one of the transit facilities;
a server connectable to each of the data collection units, the server comprising:
a data store storing inspection data, obtained from the data collection units, indicative of instances of item inspection at the plurality of transit facilities; and
a processor coupled to the data store and operable to update the data store based on data gathered at the data collection units;
a prediction system, comprising a machine learning element, and being configured to obtain input data for an item in transit and to determine therefrom a predicted level of inspection for said item; and
a computer implemented conclusion entity configured to determine a final level of inspection for an item in transit based on an indication of: (i) the predicted level of inspection for said item, (ii) a decided level of inspection for said item, and (iii) a random element;

wherein, for an item in transit through a transit facility, the system is configured to:
obtain item data providing an indication of the predicted level of inspection for the item and provide said item data to the decision entity;
obtain, from the decision entity, the decided level of inspection for the item;
operate the computer implemented conclusion entity to determine the final level of inspection for the item; and
control inspection of the item according to the determined final level of inspection for the item, wherein controlling inspection of the item in transit comprises operating a detection device at the transit facility to obtain inspection data for the item in the event that the final level of inspection indicates that the item is to be inspected, wherein the detection device is selected based on the determined final level of inspection for the item;
wherein the system is configured to train the machine learning element of the prediction system based on: (a) the final level of inspection assigned to the item in transit, and (b) inspection data obtained from inspection of the item; and
wherein the system is further configured to:
identify instances in which the predicted level of inspection for the item differs from the decided level of inspection for the item; and
for each said instance, in the event that a monitoring metric is greater than a selected threshold, output a command signal to investigate the decided level of inspection, wherein the monitoring metric is indicative of a likelihood that the difference in level of inspection should be investigated and is determined based on an indication of: (i) the predicted level of inspection for the item, and (ii) the decided level of inspection for the item.

8. The system of claim 7, wherein outputting a command signal comprises triggering an override action so that the item in transit is assigned a different level of inspection to the decided level of inspection.

9. The system of claim 8, wherein the system is configured to control inspection of the item according to the different level of inspection.

10. The system of claim 9, wherein the system is configured to determine whether or not the decided level of inspection was correct based on an outcome of the inspection of the item.

11. The system of claim 7, wherein the monitoring metric is determined based on the stored inspection data.

12. The system of claim 7, wherein the monitoring metric is determined based also on: (iii) a transit inspection metric indicative of the stored instances of item inspection at the plurality of transit facilities, and (iv) a decision entity metric indicative of stored instances of item inspection associated with the decision entity.

13. A method of controlling inspection of an item in transit through a transit facility, wherein the transit facility is part of a system comprising:
a plurality of data collection units located at a plurality of transit facilities;
a decision entity, in communication with data collection units at a selected one of the transit facilities;

a server connectable to each of the data collection units, the server comprising:
  a data store storing inspection data, obtained from the data collection units, indicative of instances of item inspection at the plurality of transit facilities; and
  a processor coupled to the data store and operable to update the data store based on data gathered at the data collection units;
a prediction system, comprising a machine learning element, and being configured to obtain input data for an item in transit and to determine therefrom a predicted level of inspection for said item; and
a computer implemented conclusion entity configured to determine a final level of inspection for an item in transit based on an indication of: (i) the predicted level of inspection for said item, (ii) a decided level of inspection for said item, and (iii) a random element;
wherein the method comprises:
  obtaining item data providing an indication of the predicted level of inspection for the item and providing said item data to the decision entity;
  obtaining, from the decision entity, the decided level of inspection for the item; and
  operating the computer implemented conclusion entity to determine the final level of inspection for the item; and
  controlling inspection of the item according to the determined final level of inspection for the item, wherein controlling inspection of the item in transit comprises operating a detection device at the transit facility to obtain inspection data for the item in the event that the final level of inspection indicates that the item is to be inspected, wherein the detection device is selected based on the determined final level of inspection for the item;
wherein the system is configured to train the machine learning element of the prediction system based on: (a) the final level of inspection assigned to the item in transit, and (b) inspection data obtained from inspection of the item.

14. A computer readable non-transitory storage medium comprising a program for a computer configured to cause a processor to perform the method of claim 13.

* * * * *